(12) United States Patent
Albrecht et al.

(10) Patent No.: US 6,254,128 B1
(45) Date of Patent: Jul. 3, 2001

(54) HYBRID GAS GENERATOR FOR AIRBAG

(75) Inventors: Uwe Albrecht, Nuremberg; Anton Bretfeld, Furth; Josef Kraft, Berg; Jiang Zhang, Nuremberg, all of (DE)

(73) Assignee: Dynamit Nobel GmbH Explosivstoff-und Systemtechnik, Troisdorf (DE)

( * ) Notice: Subject to any disclaimer, the term of this patent is extended or adjusted under 35 U.S.C. 154(b) by 0 days.

(21) Appl. No.: 09/331,415

(22) PCT Filed: Dec. 19, 1997

(86) PCT No.: PCT/EP97/07165

§ 371 Date: Sep. 1, 1999

§ 102(e) Date: Sep. 1, 1999

(87) PCT Pub. No.: WO98/28169

PCT Pub. Date: Jul. 2, 1998

(30) Foreign Application Priority Data

Dec. 21, 1996 (DE) .............................. 196 53 783

(51) Int. Cl.⁷ .................................................. B60R 21/26
(52) U.S. Cl. ........................ 280/736; 280/737; 280/741; 137/68.13; 137/68.3; 222/5
(58) Field of Search ................... 280/737, 736, 280/741; 137/68.13, 68.3; 222/5

(56) References Cited

U.S. PATENT DOCUMENTS

| | | | |
|---|---|---|---|
| 5,230,531 | * 7/1993 | Hamilton et al. | 280/737 |
| 5,242,194 | * 9/1993 | Popek | 280/737 |
| 5,257,819 | * 11/1993 | Frantom et al. | 280/737 |
| 5,273,312 | * 12/1993 | Coultas et al. | 280/737 |
| 5,344,186 | * 9/1994 | Bergerson et al. | 280/741 |
| 5,345,876 | * 9/1994 | Rose et al. | 280/737 X |
| 5,351,989 | * 10/1994 | Popek et al. | 280/737 |
| 5,582,426 | * 12/1996 | O'Loughlin et al. | 280/741 |
| 5,584,505 | * 12/1996 | O'Loughlin et al. | 280/737 |
| 5,649,720 | * 7/1997 | Rink et al. | 280/741 |
| 5,653,463 | * 8/1997 | Jeong | 280/737 |
| 5,659,295 | * 8/1997 | Renfroe et al. | 280/737 X |
| 5,779,266 | * 7/1998 | Moore et al. | 280/737 |
| 5,931,495 | * 8/1999 | Rink et al. | 280/737 |
| 6,010,153 | * 1/2000 | Halas et al. | 280/737 |

\* cited by examiner

*Primary Examiner*—Lanna Mai
*Assistant Examiner*—Toan To
(74) *Attorney, Agent, or Firm*—Antonelli, Terry, Stout & Kraus, LLP

(57) ABSTRACT

The invention relates to a gas generator for an air bag (11) including a cartridge (3) containing a gas-generating charge of solid material (5) and a storage reservoir (9) containing a storage gas (10). To trigger gas production the charge of solid material (5) is ignited. The resulting gas pressure tears off the front face (13) of the cartridge (3) along a peripheral notch (6). A sliding element (7) connected to the front face (13) pierces a sealing element (8) of the storage reservoir (9). A guiding channel (23) in which the front face (13) is guided in the manner of a piston, opens into a flow zone (12). When the front face (13) has reached the flow zone (12), reaction gas flows around the front face (13) into openings (16) in the tube-shaped sliding element (7). The reaction gas then flows into the storage reservoir (9) where it is mixed with the remaining storage gas. Because the control for releasing the two gases depends entirely on the trajectory, the operating performance of the hybrid gas generator is exact and reproducible.

6 Claims, 4 Drawing Sheets

HYBRID GAS GENERATOR FOR AIRBAG

BACKGROUND OF THE INVENTION

The invention relates to a hybrid gas generator for an air bag.

A hybrid gas generator is known from EP 0 616 578 B1 which contains a gas-generating solid charge and a storage gas. In the event of initiation, the solid material charge is ignited by an ignition element. As a result of this, a sliding piston is advanced in the direction of the storage chamber. The sliding piston contains a first bursting disc, and the closing element of the storage chamber represents a second bursting disc. After the ignition of the solid charge, the second bursting disc which closes the storage chamber is to be destroyed first, so that cold gas arrives in the air bag. The second bursting disc is to be destroyed thereafter by means of the pressure which continues to build up in the combustion chamber, so that hot gas penetrates into the storage chamber and heats the storage gas still present there. The proper functioning of this gas generator depends on the bursting behaviour of the two bursting discs. In particular the bursting disc provided at the sliding piston must be destroyed at a precisely defined pressure. The bursting disc provided at the sliding piston must open in dependence upon the pressure of the combustion gases, whereas the bursting disc which closes the storage chamber is destroyed in dependence upon the path of the sliding piston. These different dependencies have the result that the pressure build-up behaviour of the gas generator can be subjected to considerable manufacturing tolerances. The characteristic of the pressure increase in the combustion chamber and the burning characteristic must be carefully matched to the strength of the predetermined breaking points of the bursting discs, with the result that the manufacture of the gas generator requires very high levels of precision.

SUMMARY OF THE INVENTION

The object of the invention is to create a hybrid gas generator which, with simple assembly, has a reliable and reproducible operating performance and is therefore suitable for easy and economical mass production.

The object is achieved in accordance with the invention by providing a hybrid gas generator for an air bag, having a cartridge arranged in a guide channel, the cartridge containing an ignitable, gas-generated solid charge, a storage chamber closed by a closing element and containing a storage gas, and a tubular sliding element displaceable by the reaction gases of the solid charge toward the closing element and pushing the closing element open. The cartridge has a front wall which can be torn away by the reaction gases of the solid charge, with the front wall advancing, after the tearing-away, into a flow zone of larger cross section than the guide channel. The sliding element has at least one lateral opening through which the reaction gases flow out of the flow zone into the sliding element.

With the gas generator in accordance with the invention the release of the combustion gases and also the release of the storage gas take place accordance to the path of the sliding element. Because both gases are therefore controlled according to the path of the same part (sliding element), there is an exact and reproducible operating performance which is largely independent of the pressure build-up characteristic of the respective solid charge. In particular, by suitable selection of the linear dimensions of the sliding element, the flow zone and the length of the sliding-element path, the course of the pressure build-up with time can be established. Through the construction and the geometric constraint it can be guaranteed that cold storage gas flows out of the hybrid gas generator first, and that only thereafter does the mixture of the cold storage gas and the hot reaction gas flow out. Advantages of this sequence are a reduced thermal load on the air bag by gases and a lower gas pressure in the storage chamber when the reaction gas flows in.

According to a preferred development of the invention the cartridge has a retaining band projecting axially over the front wall, the retaining band being bent around an edge of the sliding element. In this way, the front wall is used, on the one hand, as a boundary for the cartridge and, on the other hand, as a carrier of the tubular sliding element. In this way, there exists the possibility of an easy and economical mass production and of a pyrotechnic cartridge which can be installed separately. Alternatively, the tubular sliding element can also be a one-part component of the cartridge.

According to a preferred development of the invention a conical section on the sliding element makes possible a smooth braking of the sliding element in the end position, and, as a result of the self-locking effect, a defined end position of the sliding element.

BRIEF DESCRIPTION OF THE DRAWINGS

Exemplifying embodiments of the invention will be explained in more detail in the following with reference to the drawings.

DETAILED DESCRIPTION OF THE PREFERRED EMBODIMENTS

Figure 1:
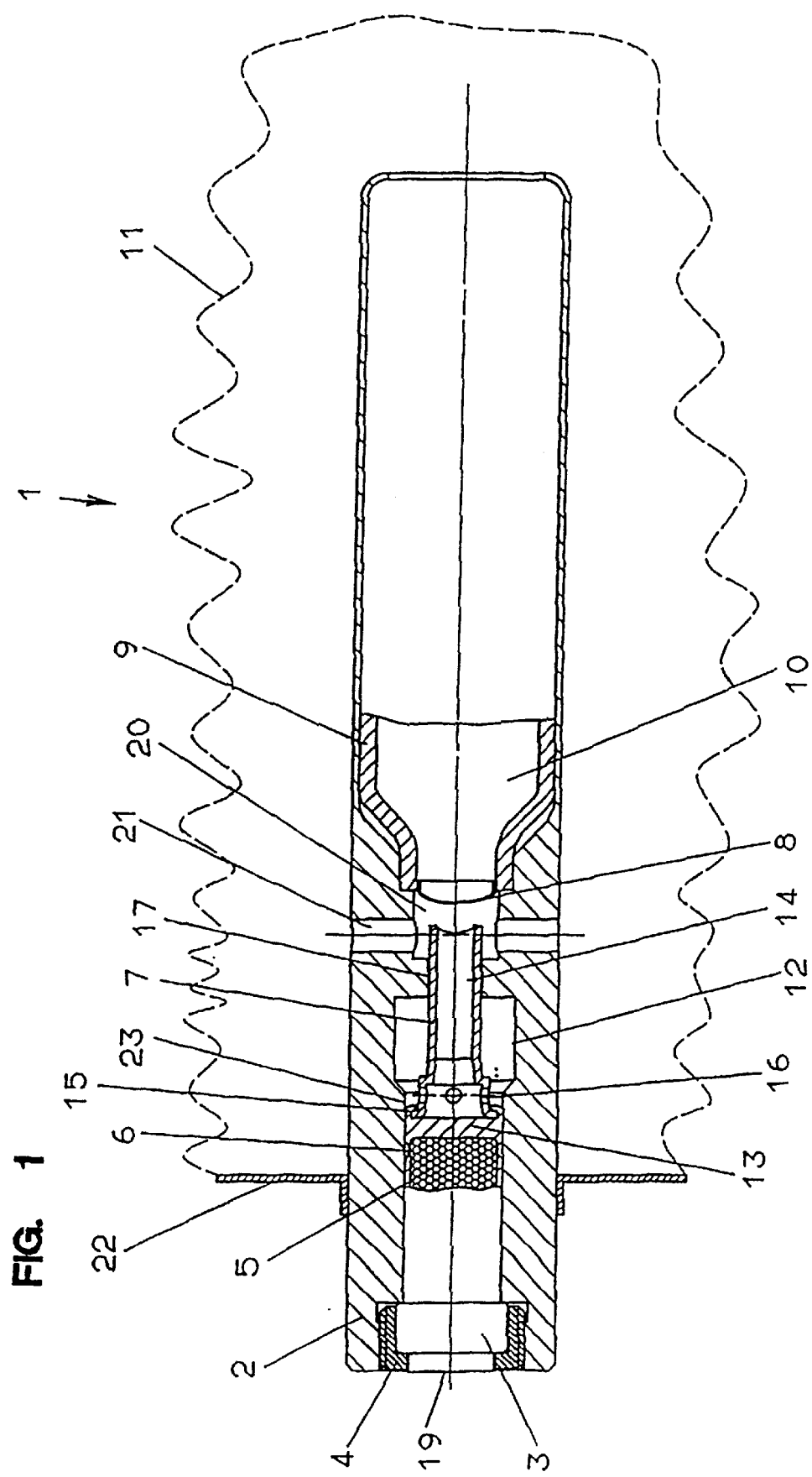
FIG. 1 shows a longitudinal section through the hybrid gas generator with the essential components before the initiation.

According to FIG. 1 the hybrid gas generator 1 is installed in an air bag 11. It has a cylindrical housing 2 in which a storage chamber 9 for gas 10 is inserted. The storage chamber 9 is sealed at its opening side by a closing element 8 comprising a bursting disc or an opening membrane. A pyrotechnic cartridge 3 is arranged opposite this closing element, the cartridge being inserted in a tightly fitting manner into a cylindrical guide channel 23 and being secured against. Being pressed out in the housing 2 by a sealing nut 4. Apart from an ignitable, gas-generating solid charge 5 there is in the cartridge 3 an ignition element (not shown). The ignition element can be electrically initiated by way of a connector which is connected to the bushing 19, and in this way the solid charge can be ignited. The cartridge 3 is preferably of aluminum and is cheaply manufactured, for example by means of reshaping procedures such as extrusion, compression and rolling.

A separable front wall 13 is arranged at the front side of the cartridge 3. The tubular sliding element 7 is secured to this front wall, the sliding element being guided in a sliding-element guide mechanism 17 of the housing 2. So that the front wall 13 can be separated from the remaining body of the cartridge 3, a peripheral notch 6 is introduced as predetermined breaking point on the peripheral wall of the cartridge 3. The peripheral wall of the cartridge 3 has a retaining band 15 projecting axially over the front wall 13 to secure the sliding element 7 on the cartridge 3. With its end facing the front wall 13, the sliding element 7 is embedded between the front wall 13 and the retaining band 15. The front wall 13 is solid and is constructed without a predetermined breaking point. It tears off altogether at the notch 6 if the pressure in the cartridge 3 increases.

In the first exemplifying embodiment the tubular sliding element 7 is manufactured by means of deep-drawing or other deformation of a sheet metal pipe. It is open at both front ends, although the end facing the cartridge 3 is subsequently closed by the front wall 13. Openings 16 are provided in the peripheral wall of the sliding element 7 for the entry of the reaction gases into the sliding element.

Figure 2:
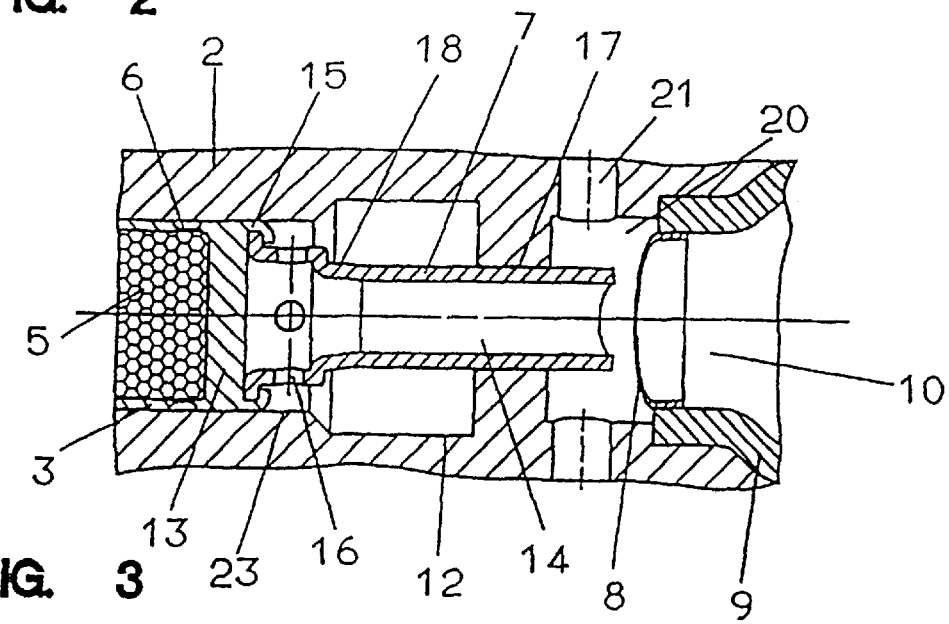
FIG. 2 shows on an enlarged scale a detail of FIG. 1 with the sliding element in the starting position.

The guide channel 23 serves, on the one hand, to accommodate the substantial part of the length of the cartridge 3 and it is extended beyond the front wall 13 of the cartridge according to FIGS. 1 and 2. The front wall 13 is disposed in the guide channel 23 like a piston. A flow zone 12 of widened cross section is connected to the guide channel 23. If the front wall 13 be in the region of the flow zone 12, the reaction gases can flow around it, so that they can penetrate into the lateral openings 16 of the sliding element 7.

The flow zone 12 is limited by the sliding-element guide mechanism 17 in which the sliding element 7 is guided in a substantially sealing manner. The sliding element projects through the sliding-element guide mechanism 17 into the exit chamber 20 which is connected to the air bag 11 by way of exit openings 21. The flow zone 12 therefore forms a closed chamber which is limited in a sealing manner by the front wall 13 and which is only connected to the exit chamber 20 by way of the interior of the sliding element 7.

The functioning sequence of the hybrid gas generator will be described in the following with reference to FIGS. 2–4.

The functioning concept of the invention is that, after the initiation of the solid charge 5, cold storage gas 10 is first of all to flow out of the exit openings 21 of the gas generator. Only then are the hot reaction gas and the mixture of cold storage gas and hot reaction gas to follow. The advantages of an outflow procedure designed in this way are the avoidance of a great increase of the gas pressure in the storage gas area as a result of too early an inflow of the reaction gas as well as the reduction of the thermal loading of the air bag by way of a high gas temperature.

The cartridge 3 can be electrically or mechanically ignited. The ignition characteristic and burning characteristic are adjusted in such a way that a defined gas pressure increase is achieved in the cartridge. The rising gas pressure separates off the front wall 13 from the rest of the sleeve by a tearing-open at the notch 6, and accelerates the front wall 13, with the sliding element 7 secured thereto, in the direction of the closing part 8 of the storage chamber 9. In the process, the sliding element pushes through the closing element 8 which is designed in such a way that, after the pushing-through and under the action of the gas pressure of the storage gas 10, it is immediately almost completely destroyed, so that the opening which is produced is larger than the outer diameter of the sliding element. The storage gas 10 can therefore flow into the exit chamber 20 despite the sliding element having penetrated into the storage gas container.

Figure 3:
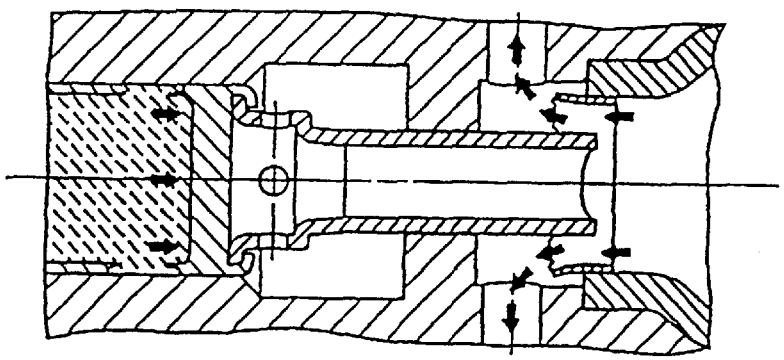
FIG. 3 shows the sliding element in an intermediate position with the front wall torn away from the cartridge and with the destroyed closing element of the storage chamber, with the reaction gas still being contained in the guide channel.
Figure 4:
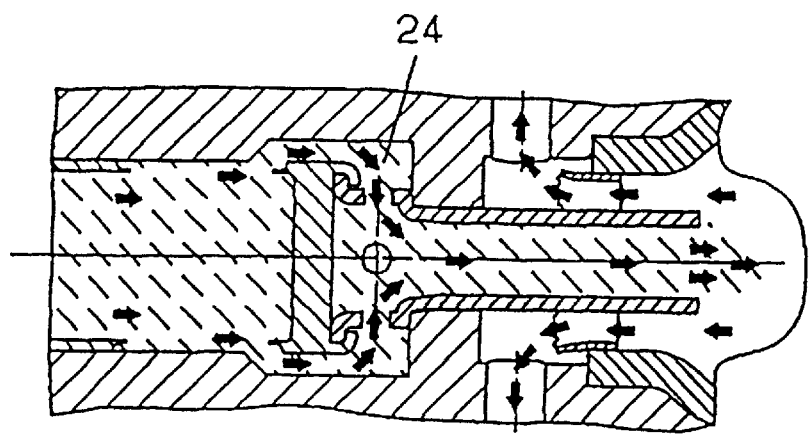
FIG. 4 shows the sliding element in its end position after the release of the reaction gas.

The axial position of the flow zone 12 is coordinated with the geometric position of the pushing-through of the closing element 8 by the sliding element 7 in such a way that the pushing-through takes place first, before the sliding element, with the front wall 13 connected thereto, leaves the guide channel 23 (FIG. 3). As long as the sliding element 7, with the front wall 13 connected thereto, is guided through the guide channel 23, the reaction gas remains enclosed. A flowing of the reaction gas through the sliding element is prevented. As a result of this geometric constraint cold storage gas 10 escapes from the gas generator first.

After the closing element 8 has been pushed through, the sliding element penetrates further into the storage chamber 9. Only in the end phase of the displacement of the sliding-element does the sliding element 7, with the front wall 13 connected thereto, leave the guide channel 23. After reaching the flow zone 12 and in the end position of the sliding element (FIG. 4), the hot reaction gas, which was enclosed up until then, flows through the flow path 24 of the flow zone 12, the radial openings 16 and the cavity 14 of the sliding element into the storage chamber 9. The reaction gas mixes with the remaining storage gas 10 which is still located in the storage chamber 9, and flows out together with the storage gas through the exit openings 21. The sliding element 7 has a conical section 18. In the end position according to FIG. 4 the sliding element is pressed into the cylindrical piston guide mechanism 17 due to a radial oversizing of the section 18. A tight fit is produced. The conical section 18 therefore fulfils two tasks. The sliding element is smoothly braked upon reaching the end position (i.e. the impact is cushioned) and the sliding element is prevented from moving back in the direction of the cartridge 3 due to the strong self-locking. The defined end position of the sliding element favours a good mixing of the reaction gas with the storage gas 10 and reduces the dispersion of the outflow procedure and the output power of the gas generator.

Figure 5:
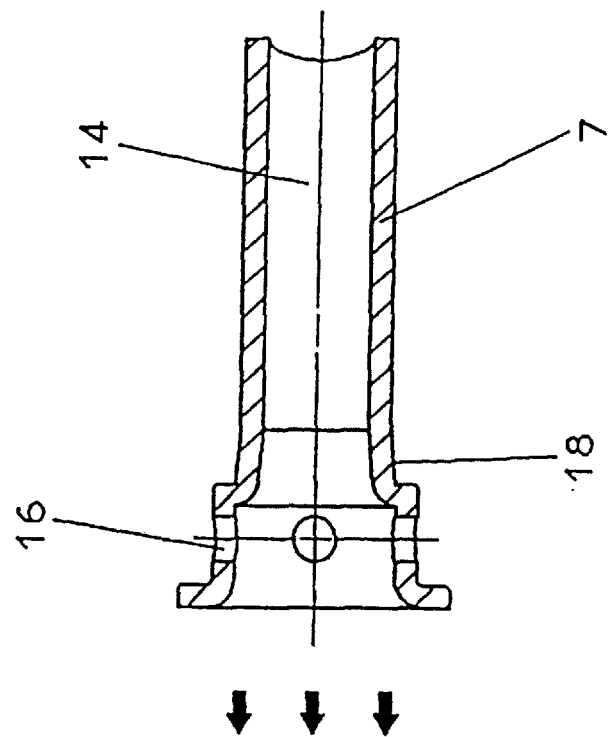
FIG. 5 shows the fastening of the sliding element to the cartridge by means of beading.
Figure 5:
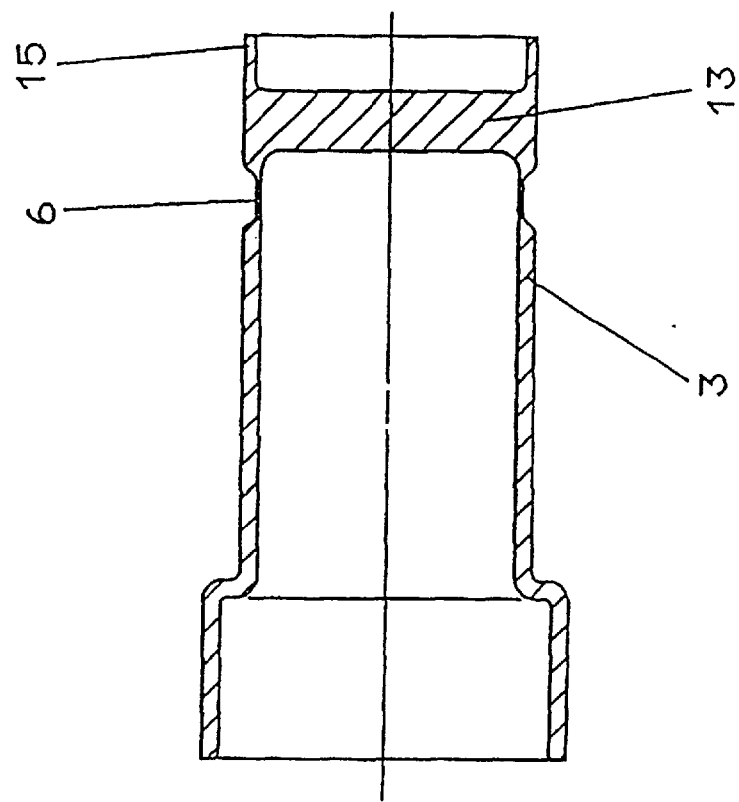

FIG. 5 shows the joining-together of the cartridge 3 and the sliding element 7. The cartridge 3 has a retaining band 15 projecting over the front wall 13, which retaining band can be beaded around the edge of the sliding element 7.

Figure 6:
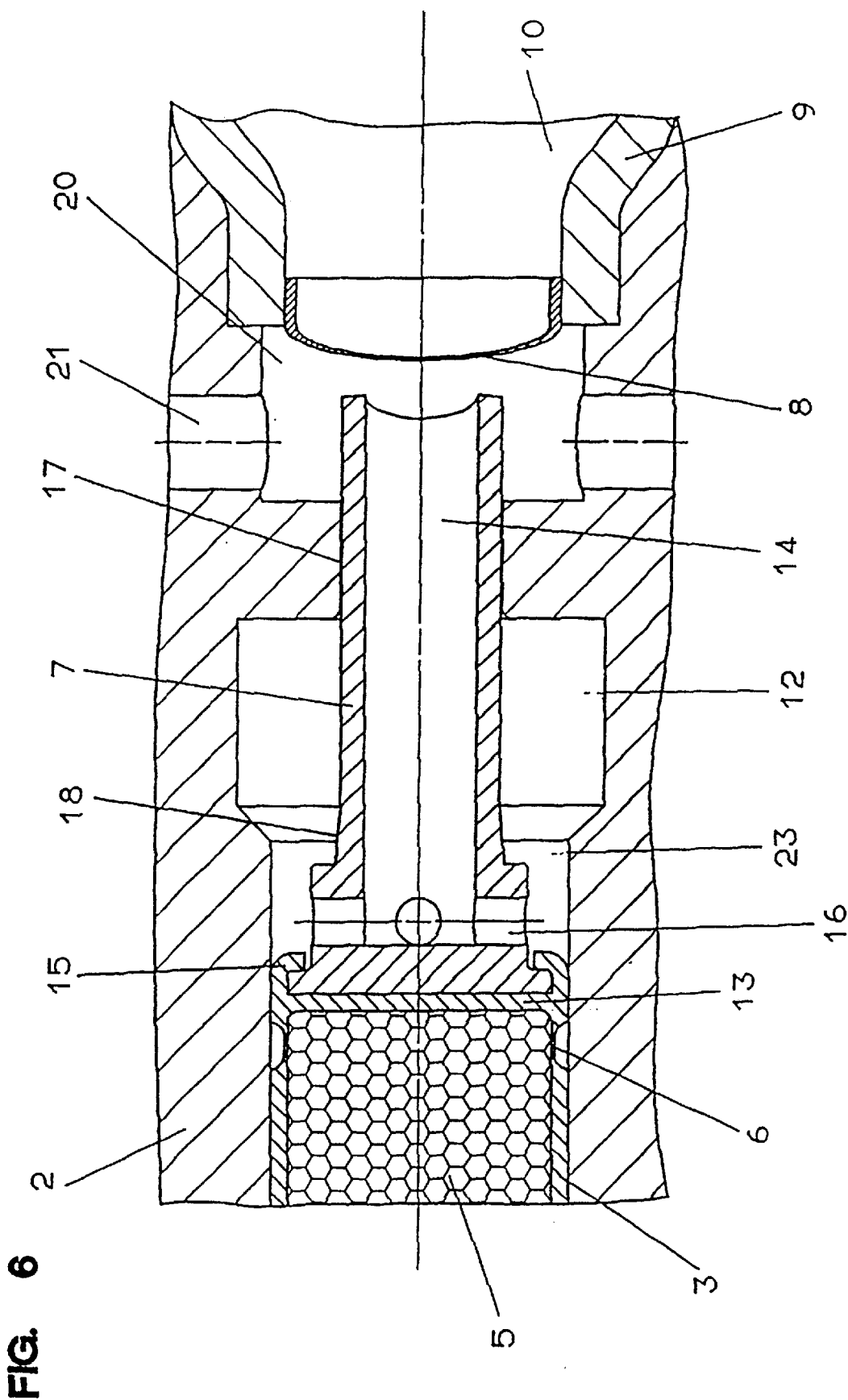
FIG. 6 shows another embodiment of the sliding element fastened to the cartridge.

FIG. 6 shows a slightly modified form of the sliding element 7. Here the sliding element 7 has a wall closing the cartridge-side end, with the wall being provided with an outwardly projecting flange, the flange being overlapped by the retaining band 15 of the cartridge 3.

What is claimed is:

1. Hybrid gas generator for an air bag, having a cartridge arranged in a guide channel, the cartridge containing an ignitable, gas-generated solid charge, a storage chamber closed by a closing element and containing a storage gas, and a tubular sliding element displaceable by the reaction gases of the solid charge toward the closing element and pushing the closing element open, characterized in that the cartridge has a front wall which can be torn away by the reaction gases of the solid charge, with the front wall advancing, after the tearing-away, into a flow zone of larger cross section than the guide channel, and in that the sliding element has at least one lateral opening through which the reaction gases flow out of the flow zone into the sliding element.

2. Hybrid gas generator according to claim 1, characterized in that the flow zone is arranged in such a way that it is only reached by the front wall of the cartridge of the cartridge after the sliding element has pushed open the closing element.

3. Hybrid gas generator according to claim 1, characterized in that the cartridge has a retaining band projecting axially over the front wall, with the retaining band being bent around an edge of the sliding element.

4. Hybrid gas generator according to claim 1, characterized in that the sliding element has a conical section for braking the sliding-element movement upon penetration into a sliding-element guide mechanism.

5. Hybrid gas generator according to claim 1, characterized in that an end of the sliding element adjacent the cartridge is closed to flow of reaction gases, whereby reaction gases flow from the cartridge into the sliding element only through the at least one lateral opening.

6. Hybrid gas generator according to claim 1, characterized in that an end of the sliding element adjacent the cartridge is closed to flow of reaction gases by the front wall of the cartridge.

* * * * *